United States Patent Office 2,869,382
Patented Jan. 20, 1959

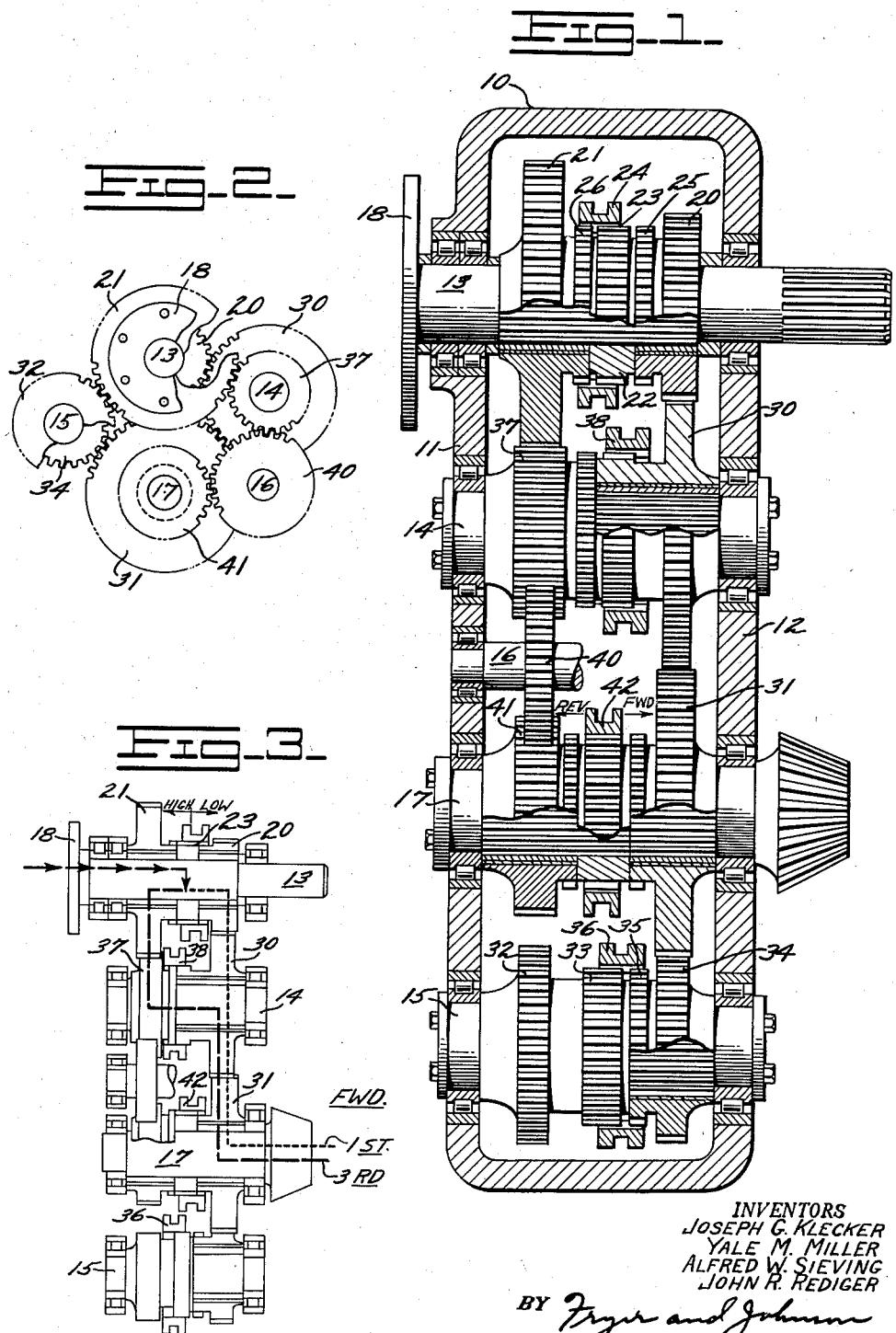

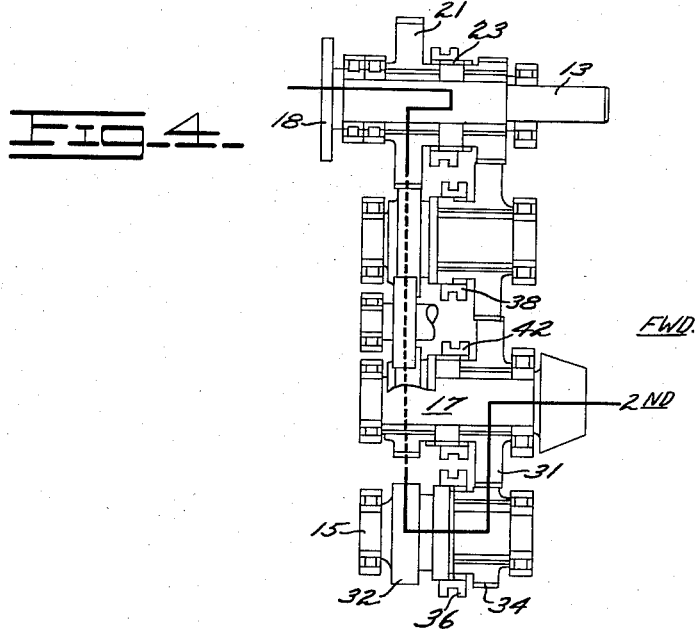
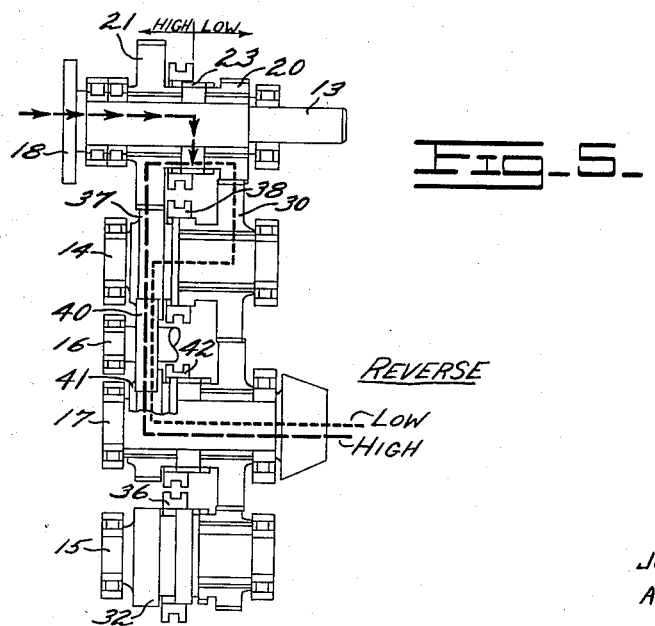

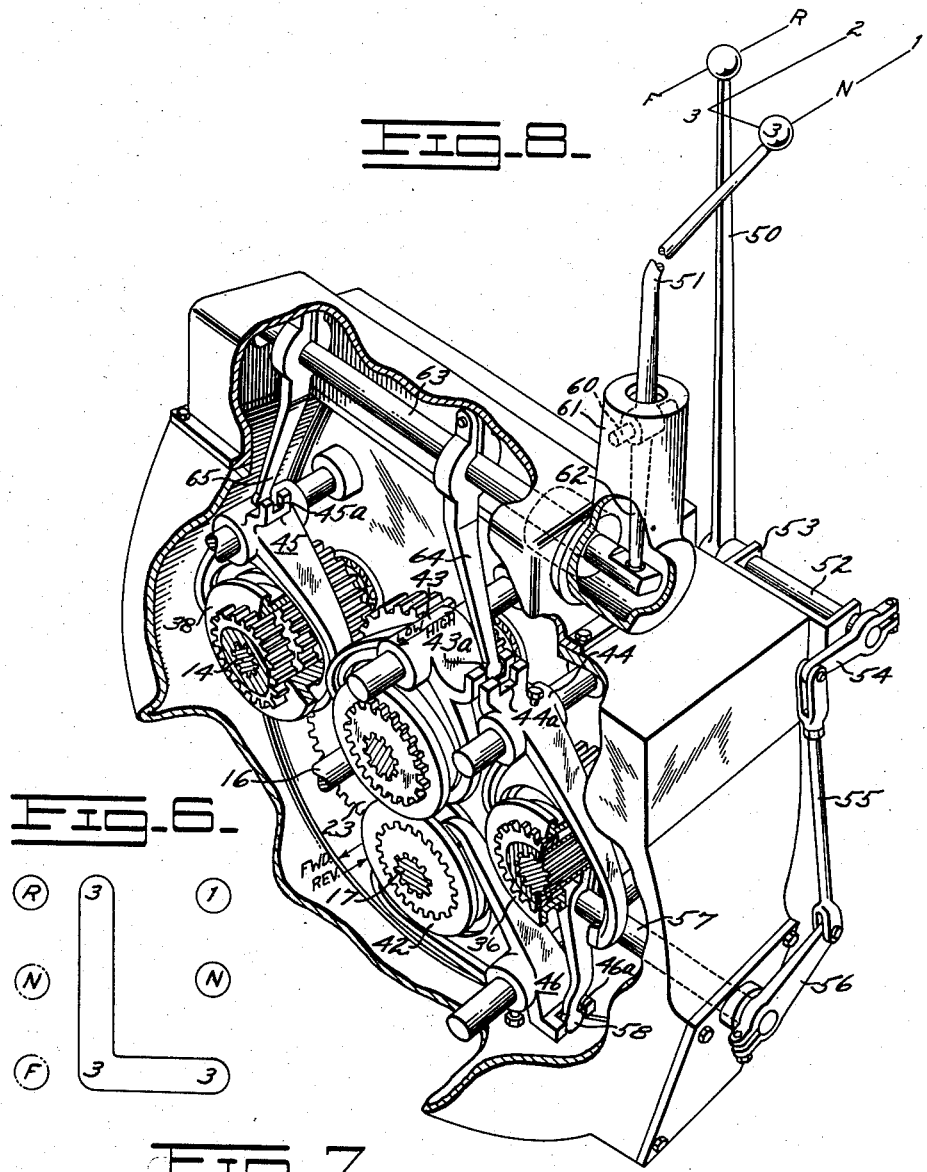
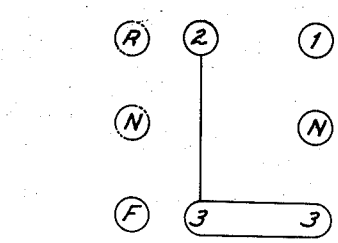

2,869,382

GEAR TYPE POWER TRANSMISSION AND CONTROLS THEREFOR

Joseph G. Klecker, Peoria, Yale M. Miller, Morton, Alfred W. Sieving, Peoria, and John R. Rediger, Secor, Ill., assignors to Caterpillar Tractor Co., Peoria, Ill., a corporation of California Application March 21, 1955, Serial No. 495,706

7 Claims. (Cl. 74—360)

This invention relates to gearing arrangement in speed-change transmissions of the countershaft type and control mechanisms associated therewith. It is particularly adaptable to transmissions having variable speeds selectively operable in both forward and reverse and provided with a plurality of shiftable members to effect changes in gear ratios as well as a shiftable member to effect a change in the direction of rotation of the transmission output shaft.

The transmission and control mechanism are especially designed for vehicles used in pulling or pushing operations which require frequent reversal of direction of travel as well as frequent changes in the speed of the vehicle and the torque transmitted to the driving members. As an example of these pushing operations, wheel-type and track-type tractors are frequently provided with a bulldozing blade attached to the front of the tractor for moving earth, gravel, or other loose material while the tractor is traveling in a forward direction. While moving this material, the tractor usually travels at a low rate of speed and requires the use of a power transmission having a low-speed gear which will transmit a large amount of torque to the drive wheels, or tracks. While the tractor is moving backwardly to be repositioned for a subsequent loading cycle, it is desirable to employ another gear ratio in the transmission to effect a higher reverse speed and thereby minimize non-productive time. It is a common practice to provide a bulldozing tractor with a power transmission which has a multi-speed range in reverse as well as forward, and also separate controls for effecting shifts in the speed-change gears and the forward-reverse gears. In operating tractors provided with present transmissions having a multi-speed range in both forward and reverse, it is necessary to reposition both the speed-change control lever and the forward-reverse lever if it is desired to travel in reverse at a higher speed than that used in the forward direction.

Therefore, it is an object of this invention to provide an arrangement of gearing and control mechanism in a transmission having a plurality of speed-change gears selectively operable in power trains of either forward or reverse directions and having separate control means for the speed-change gearing and the forward-reverse gearing whereby the gearing and control arrangement permits the transmission to be shifted from a forward drive at a low-speed ratio to a reverse drive at a higher-speed ratio by operation of only the forward-reverse gearing control means. With this arrangement a bulldozing tractor may be operated in a low-speed forward gear and shifted to a higher-speed gear in a reverse direction without the necessity of repositioning both the speed-change control as well as the forward-reverse control.

A bulldozer-tractor may also be used in other operations such as assisting in the loading of earthmoving vehicles known as scrapers, which are drawn by high-speed, wheel-type tractors and are loaded by advancing a blade below the surface of the ground to force earth into the hopper of the scraper. This operation is commonly referred to as push-loading of scrapers.

While the scraper is being loaded and the tractor is being used as a pusher, it is imperative that the transmission impart high torque at low speed to the driving members by means of a high gear-ratio, so that the tractor may produce the maximum tractive effort; usually, the transmission of the pusher-tractor is positioned for a first-speed, or a second-speed, gear train depending upon the type of material to be loaded into the scraper and the particular gear ratios available in the transmission. As soon as the scraper is loaded, it is desirable to give the wheeled tractor and scraper a push at a higher speed so that they may attain sufficient speed to permit a shift into the high-speed gear train provided in such tractor and scraper combinations and used while transporting the loaded scraper to a zone where it will be unloaded. This necessitates the transmission of the pusher-tractor being shifted into a higher speed than that used during the push-loading operation. It is desirable that this shift of speed-change gears take place in a minimum amount of time so that neither the pusher-tractor nor the loaded scraper and the draft tractor lose any momentum which would have to be recovered in a higher-speed gear when less torque is available. Transmissions of current design usually provide a shift pattern for the seed-change control lever known as an "H-type" pattern, or a modified "H" pattern, which permits a shift into the high-speed gear by movement of the control lever in a straight line from only one of the lower-speed gears. Since a pusher-tractor must be used in push-loading with the transmission in a low-speed gear which may be either a first-speed or a second-speed gear, depending upon the gear ratios available and the type of material being loaded, it is desirable that the transmisison of the pusher-tractor be shifted with ease and celerity from either of the gears used in loading to a higher speed gear. Therefore, it is another object of this invention to provide a variable speed transmission and control therefor to permit a shift from either a first-speed position or a second-speed position into a higher-speed position by movement of the control lever in a straight line.

In pusher tractors, it is also desirable to use a hydraulic torque converter in conjunction with a variable-speed gear-type transmission; however, the transmission must be of short axial dimension to conform to the longitudinal space available in tractors of current design. Therefore, another object of this invention is to provide a three-speed forward, two-speed reverse power transmission of short axial dimension.

These and other objects of this invention will become apparent from the following description which refers to the accompanying drawings in which:

Fig. 1 is a devolped view in cross-section of the transmission to show the supporting shafts, the speed-change gear arrangement, the forward and reverse gear arrangement, and the positive drive clutches associated with the gears;

Fig. 2 is a schematic end view from the input side of the transmission showing the relative positions of the shafts and the gears in a constant-mesh condition;

Fig. 3 is a developed schematic view of the transmission, shafts, gearing and clutch devices, showing their relationship while the transmission is driving in a forward direction and illustrating the power path used in the forward drive in the first and third speed ranges;

Fig. 4 is like Fig. 3 but shows the power path used in the forward drive in the second or intermediate speed range;

Fig. 5 is like Fig. 3 but shows the power path used in the reverse drive in the low and high speed range;

Fig. 6 is a diagram showing the movement of the control levers to obtain the various gear ratios and neutral with the forward-reverse control lever in the reverse position;

Fig. 7 is a diagram showing the movement of the speed-change control lever to obtain the various gear ratios and neutral with the forward-reverse lever in forward; and Fig. 8 is a perspective view from the output side of the transmission case with parts broken away to show the supporting shafts and the gear arrangement as well as the control mechanism used to shift the collars of the clutch devices associated with the gearing.

In Fig. 1 a transmission case 10 of short axial dimension is illustrated as provided with a forward end wall 11 and a rearward end wall 12. An input shaft 13, a first countershaft 14, a second countershaft 15, a reverse idler shaft 16, and an output shaft 17 are disposed parallel to each other within the transmission case, and all the shafts are rotatably supported by suitable bearings provided in apertures in the end walls 11 and 12.

The input shaft 13 is adapted to be connected to a source of power through means such as a disconnectable clutch, fluid coupling, or hydraulic torque converter (not shown) which can be secured to a flange 18 on the shaft. Rotatably carried on the input shaft 13 is a low-range input gear 20, used in a first-speed power train, and a high-range input gear 21 used in second-speed and a third-speed power trains. Drivably mounted as by splines on the input shaft is a hub member 22 of a conventional positive-drive clutch device 23, the function of which is to connect selectively the low-range input gear 20 and the high-range input gear 21 in a driven relationship to the input shaft 13. To this end, the clutch device 23 is provided with an internally-toothed collar 24 which may be moved to the right (as viewed in Fig. 1) to engage clutch teeth 25 on the low-range input gear 20 and moved to the left to engage clutch teeth 26 on the high-range input gear 21. All of the gears used in the transmission are of the constant-mesh type; all gears rotatably carried on their supporting shafts are adapted to be included selectively in the various power trains by the shifting of sliding collars of conventional positive-drive clutch devices similar to clutch 23.

A first-speed gear 30 is drivably mounted on the first countershaft 14 and is in constant mesh with the low-range input gear 20 as well as in mesh with a forward output gear 31 rotatably carried on the output shaft 17. The gears 20, 30, and 31 comprise the first-speed forward power train.

A second-speed gear 32, drivably mounted on the second countershaft 15, meshes with the high-range input gear 21 (see Fig. 2), and is provided with an externally-toothed shoulder 33 which performs the same function as the hub 22 of clutch device 23. A second-speed drive gear 34, rotatably mounted on the second countershaft 15 may be connected to the second-speed gear 32 in a driven relationship by means of an externally-toothed shoulder 35 and an internally toothed clutch collar 36. The drive gear 34 is in mesh with the forward output gear 31; thus gears 21, 32, 34, and 31 comprise the second-speed forward power train.

A third-speed gear 37 is rotatably carried on the first countershaft 14 and is adapted to be drivably connected to the countershaft by means of a clutch device 38. Thus, the third-speed power train comprises the high-range input gear 21, the third-speed gear 37, the first-speed gear 30 and the forward output gear 31.

A reverse idler gear 40 is secured to the reverse idler shaft 16 and constantly meshes with the third-speed gear 37 and also with a reverse output gear 41 rotatably carried on the output shaft 17. Another clutch device 42 is provided on the output shaft to connect selectively the forward output gear 31 and the reverse output gear 41 in a driving relationship with the output shaft.

The first-speed power train in reverse comprises the low-range input gear 20, the first-speed gear 30, clutch 38, the third-speed gear 37, the reverse idler 40, and the reverse output gear 41. The third-speed power train in reverse comprises the high-range input gear 21, the third-speed gear 37, the reverse idler 40 and the reverse output gear 41. The reverse gear train is isolated from the second-speed gear; therefore, no second-speed reverse is provided in the transmission. With this forward-reverse gearing arrangement and control mechanism, to be described below, the transmission may be shifted from a second-speed forward to a third-speed reverse by shifting of forward-reverse clutch device 42.

While the high-range input gear 21 is connected to the input shaft 13 by means of clutch collar 24 being moved to the left (as shown in Fig. 1), both the second-speed gear 32 and the third-speed gear are being driven by the high-range input gear. With clutch devices 36 and 38 positioned to the right (also shown in Fig. 1), the forward output gear is driven by the second-speed gear 32 through the drive gear 34 at a second-speed rate of rotation, and at the same time, the third-speed gear 37 drives the reverse output gear 41 by means of the reverse idler 40 at a third-speed rate of rotation. Therefore, the direction of rotation of the output shaft, as well as the rate of rotation, can be selected by shifting the clutch device 42. If the clutch 42 is moved to the right (while the other clutches 23, 36, and 38 are positioned as shown in Fig. 1), the forward power train is effective through the second-speed gear; if the clutch 42 is then moved to the left, the reverse power train is effective through the third-speed gear.

As illustrated in Fig. 8, the clutch devices 23, 36, 38, and 42 are provided with shifting forks 43, 44, 45, and 46, respectively, each adapted to be received in an annular groove in the movable collar of the clutch with which the particular fork is associated. By means of the forks the clutches may be positioned to include the various gears in the several power trains.

Each fork is supported in the transmission case by an independent shift rail, and axial movement of the fork may be provided either by slidably mounting the fork on a fixed rail or by securing the fork to a rail adapted for reciprocal axial movement in the transmission case. The method of mounting the forks and their supporting rails may be selected to correspond to the axial distance available in the transmission case and the type of interlock used with the control mechanism.

The shifting fork control mechanism includes a forward-reverse control lever 50 and a speed-change control level 51; movement of these control levers required to effect the various available gear ratios is shown in Figs. 6, 7, and 8. It will be observed that a shift from a first-speed to third-speed and a shift from a second-speed to third may be accomplished by a straight-line movement of the speed-change control lever 51; also, shifting the control lever 50 from the "forward" position to the "reverse" position while the speed control lever is in the second-speed position will result in a shift of gear ratios from second-speed forward to third-speed reverse. The means by which movement of the control levers 50 and 51 in accordance with Figs. 6, 7, and 8 is translated into the required movements of the shift devices will be described below.

The forward-reverse control lever 50 is secured to one end of a shaft 52 pivotally mounted in a bracket 53 joined to the transmission case 10. A lever arm 54, fixed to the other end of shaft 52, is pivotally fastened to a link 55 connected to another lever arm 56. Arm 56 is fixed to a shaft 57, which is disposed in a suitable aperture in the case 10 and adapted for rocking movement. On the inner end of shaft 57 is secured a shifting finger 58 adapted to be received in a notch 46a provided in the shift fork 46. By means of this linkage, movement of the lever 50 to the position marked "F" will result in movement indicated by the arrow "FWD," of the shift fork 46 and engagement of its associated clutch 42 with the forward output gear 31. This engaged position of clutch 42 with the forward output gear 31 is illustrated in Figs. 3 and 4 showing the schematic diagram of the forward power trains. Moving the lever 50 to the position marked "R" will result in a movement of clutch 42 in an opposite direction and indicated by the arrow "REV."; the clutch 42 will then be engaged with the reverse output gear 41 as illustrated in Fig. 5.

The speed-change control lever 51 is adapted for limited lateral motion by means of a pivot pin 60 disposed in a support column 61 which is mounted in the transmission case 10 for rocking motion. A cane end 62 of the control lever 51 is connected to a cross-shaft 63 supported for reciprocal, as well as rocking movement. The cross-shaft 63 carries a pair of spaced shifting fingers 64 and 65; the finger 64 is adapted to be received in a notch 43a provided in shift fork 43 controlling the low and high-range input gears and also in a notch 44a provided in shift fork 44 controlling the first and third-speed gears; and the finger 65 is received in a notch 45a in shift fork 45 controlling the second-speed gear. The fingers 64 and 65 are appropriately spaced so that the forks 44 and 45 are shifted simultaneously while fork 43 is shifted independently of the other forks.

The control lever 51 and the shift forks 43, 44, and 45 are illustrated in Fig. 8 as being positioned to result in a third-speed gear ratio; this condition is also shown in the schematic diagram of Fig. 3 with clutch 23 connecting the high-range gear 21 with the input shaft, clutch 38 connecting the third-speed gear 37 with the countershaft 14 to comprise the third-speed power path indicated by the broken line.

The tranmission may be shifted to a first-speed gear ratio by moving the control lever 51 to the position marked "1," which results in a rearward movement of fork 43 and clutch 23 to the lower-range position and connects the low input gear 20 with the input shaft. The first-speed power path is indicated by the dotted line in Fig. 3.

To shift the transmission to the second-speed gear ratio, the fork 43 and clutch 23 must first be shifted to the position shown in Fig. 8, i. e. the third-speed position in which the notches of the speed-change shift forks are aligned. The lever 51 is then moved laterally to the left which causes both shifting fingers 64 and 65 to be moved laterally to the right and to index with notches 44a and 45a in their respective shift forks 44 and 45; forward movement of the control lever 51 to the position "2" will shift the forks 44 and 45 as well as the clutches 36 and 38, respectively, associated with the forks. This results in the third-speed gear 37 being disconnected from the forward power train and at the same time, causing the clutch 36 to include the second-speed gear 32 in the power train. This condition is illustrated in Fig. 1 and the diagrammatic power train in Fig. 4.

With the control mechanism positioned to effect a second-speed forward, movement of the forward-reverse lever to the position marked "R" will cause collar 42 to disengage forward output gear 31 and engage reverse gear 41 to result in a third-speed in reverse as illustrated in Fig. 1. As explained above, this third-speed reverse is effected because the reverse idler 40 is turned by the third-speed gear 37 and isolated from the second-speed power train.

If the controls 50 and 51 are positioned to effect a first or a third-speed forward, movement of forward-reverse lever 50 to a position "R" will result in a corresponding first or third-speed reverse as illustrated in Fig. 5.

We claim:

1. A transmission comprising input and output shafts, a first countershaft, a second countershaft, a first-speed power train of constant-mesh gears comprising a low-range input gear on the input shaft, a first speed-change gear on the first countershaft, and a forward output gear on the output shaft, a second-speed power train of constant-mesh gears comprising a high-range input gear on the input shaft, a second speed-change gear in conjunction with a second-speed drive gear on the second countershaft, and the forward output gear, a third-speed power train of constant-mesh gears comprising the high-range input gear, a third speed-change gear on the first countershaft in conjunction with the first speed-change gear, and the forward output gear, and means to include selectively the first, the second, and the third speed-change gears in the respective power trains.

2. A transmission comprising input and output shafts, a first countershaft, a second countershaft, a reverse idler shaft, a first-speed forward power train of constant-mesh gears comprising a low-range input gear on the input shaft, a first speed-change gear on the first countershaft, and a forward output gear on the output shaft, a second-speed forward power train of constant-mesh gears comprising a high-range input gear on the input shaft, a second speed-change gear in conjunction with a second-speed drive gear on the second countershaft, and the forward output gear, a third-speed forward power train of constant-mesh gears comprising the high-range input gear, a third speed-change gear on the first countershaft in conjunction with the first speed-change gear, and the forward output gear, a first-speed reverse power train comprising the low-range input gear, the first speed-change gear in conjunction with the third speed-change gear on the first countershaft, a reverse idler gear on the reverse idler shaft, and a reverse output gear on the output shaft, a third-speed reverse power train comprising the high-range input gear, the third speed-change gear, the reverse idler gear and the reverse output gear, and means to include selectively the first, the second, and the third speed-change gears in their respective forward power trains and to include selectively the first and the third speed-change gears in their respective reverse power trains.

3. In a torque transmitting mechanism having first, second, and third shiftable elements, said first element being shiftable independently of the other two and said second and third elements being shiftable simultaneously only after the first element has been shifted into alignment with the other elements, means for effecting a mutually exclusive operation of said first element and said second and third elements comprising spaced shift fingers for engaging said elements, and means for moving the shift fingers across the elements to select the element to be shifted including a control lever adapted to be moved in a U-shaped pattern.

4. A transmission comprising input and output shafts, a pair of countershafts, a reverse idler shaft, a low range gear and a high range gear on the input shaft, means for connecting selectively said gears to the input shaft in driven relationship, speed-change gears on the countershafts, means for including selectively the speed-change gears in various power trains, a reverse idler gear on the reverse idler shaft, forward and reverse output gears on the output shaft, said gears being arranged in separate constant mesh groups to form independently selectable power trains, and means for connecting selectively said forward and reverse gears to the output shaft in driving relation thereto.

5. In a torque transmitting mechanism of the type having separate groups of constant mesh gears having a first, second and third speed-change gear, first, second and third shiftable elements which comprise clutch means for selectively including different gears in a power train, said first element for including either the first or third speed-change gear in the power train, said second and third elements for including either the second or the third speed-change gears in a power train, means for effecting a mutually exclusive operation of the first element and the second and third elements, including a control lever adapted to be moved in a U-shaped pattern in which a shift from either the first gear to the third gear or from the second gear to the third gear may be effected by a straight line movement of said control lever.

6. In a torque transmitting mechanism having input and output shafts, a pair of countershafts, a reverse idler gear and shaft, input gears on the input shaft, speed-change gearing on the countershafts, forward and reverse output gears on the output shaft, first, second, and third shiftable elements for shifting into any one of three speed-change gear ratios, and a fourth shiftable element for shifting into either the forward or the reverse output gear, said gears being arranged in separate constant mesh groups to form independently selectable power trains, and control means for effecting a mutually exclusive operation of the shiftable elements associated with the speed-change gears and the shiftable element associated with the forward and reverse output gears.

7. In a torque transmitting mechanism having input and output shafts, a pair of countershafts, a reverse idler gear and shaft, input gears on the input shaft, speed-change gearing on the countershafts, forward and reverse output gears on the output shaft, said gears being arranged in separate constant mesh groups to form independently selectable power trains, first, second, and third shiftable elements for shifting into any one of three speed-change gear ratios, a fourth shiftable element for shifting into either the forward or the reverse output gear, and separate control means for effecting a mutually exclusive operation of the first element and the second and third elements, and separate control means for operation of the fourth shiftable element, an arrangement of speed-change gearing, reverse idler gear, and forward and reverse output gears to effect a shift from a forward second speed to a reverse third speed upon operation of the fourth shiftable element control means.

References Cited in the file of this patent

UNITED STATES PATENTS

| | | |
|---|---|---|
| 2,547,317 | Gustofson | Apr. 3, 1951 |
| 2,552,765 | Bixby | May 15, 1951 |
| 2,633,754 | Gerst | Apr. 7, 1953 |
| 2,712,245 | Lee | July 5, 1955 |